(12) United States Patent
Park et al.

(10) Patent No.: US 12,096,887 B2
(45) Date of Patent: Sep. 24, 2024

(54) BLENDER AND CONTAINER FOR BLENDER

(71) Applicant: LG ELECTRONICS INC., Seoul (KR)

(72) Inventors: Hyunwoo Park, Seoul (KR); Jongho Lee, Seoul (KR); Kijoong Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 387 days.

(21) Appl. No.: 17/036,156

(22) Filed: Sep. 29, 2020

(65) Prior Publication Data
US 2021/0127904 A1 May 6, 2021

(30) Foreign Application Priority Data
Nov. 4, 2019 (KR) .......................... 10-2019-0139508

(51) Int. Cl.
*A47J 43/07* (2006.01)
*A47J 43/046* (2006.01)
*A47J 43/08* (2006.01)

(52) U.S. Cl.
CPC ......... *A47J 43/0716* (2013.01); *A47J 43/046* (2013.01); *A47J 43/0722* (2013.01); *A47J 43/0727* (2013.01); *A47J 43/085* (2013.01)

(58) Field of Classification Search
CPC .. A47J 43/046; A47J 43/0716; A47J 43/0722; A47J 43/0727; A47J 43/085
USPC ..................................................... 241/282.1
See application file for complete search history.

(56) References Cited

U.S. PATENT DOCUMENTS

| 9,993,114 B2 * | 6/2018 | Thomas .................. B01F 35/45 |
| 10,051,998 B2 | 8/2018 | Boozer et al. |
| 2015/0117137 A1 | 4/2015 | Haney et al. |
| 2016/0287018 A1 | 10/2016 | Thomas et al. |
| 2018/0098666 A1 | 4/2018 | Lee |
| 2019/0099042 A1 | 4/2019 | Leppert et al. |

(Continued)

FOREIGN PATENT DOCUMENTS

| CN | 206082526 U | 4/2017 |
| CN | 107616725 A | 1/2018 |
| CN | 108261114 A | 7/2018 |

(Continued)

*Primary Examiner* — Christopher L Templeton
*Assistant Examiner* — Fred C Hammers
(74) *Attorney, Agent, or Firm* — Bryan Cave Leighton Paisner LLP

(57) ABSTRACT

A blender includes a main body provided with a motor assembly, a container detachably mounted on the main body and having an opened upper surface to form a space in which food is received, a blade mounted at a bottom surface of the container to crush food by rotation, a main lid shielding the opened upper surface of the container and formed with a through-hole which is opened to communicate with the inside of the container, an auxiliary lid inserted into the through-hole and configured to open and close the through-hole, and an air vent formed between the auxiliary lid and an inner surface of the through-hole to discharge the air inside the container to the outside, where an inlet and an outlet of the air vent are disposed on different vertical extension lines with respect to a bottom surface of the auxiliary lid.

15 Claims, 14 Drawing Sheets

(56) References Cited

U.S. PATENT DOCUMENTS

2019/0239681 A1    8/2019    Thies et al.

FOREIGN PATENT DOCUMENTS

| CN | 108652480 A | 10/2018 |
|----|----|----|
| CN | 208658651 U | 3/2019 |
| DE | 10 2010 017387 A1 | 12/2011 |
| DE | 10 2014 100967 A1 | 2/2015 |
| EP | 3517003 A1 | 7/2019 |
| JP | 2001129381 A | 5/2001 |
| JP | 2012-006346 A | 1/2012 |
| KR | 200354814 Y1 | 6/2004 |
| KR | 10-0850796 B1 | 8/2008 |
| KR | 10-2012-0020814 A | 3/2012 |
| KR | 10-2018-0040478 A1 | 4/2018 |
| WO | 2015074720 A1 | 5/2015 |

\* cited by examiner

BLENDER AND CONTAINER FOR BLENDER

CROSS-REFERENCE TO RELATED APPLICATIONS

The present application claims priority under 35 U.S.C. 119 and 35 U.S.C. 365 to Korean Patent Application No. 10-2019-0139508, filed on Nov. 4, 2019, which is hereby incorporated by reference in its entirety.

BACKGROUND

The present disclosure relates to a blender and a blender container.

In general, a blender is a household appliance that chops food contained in a container, crushes the food into powder, or makes the food into a state such as a liquid by a blade rotated by an electric motor and is also commonly referred to as a mixer.

In a typical blender, a container is seated on an upper surface of a main body in which a motor is built, and when the container is seated, a blade inside the container is connected to a rotational shaft of the motor to be rotatable. In addition, the user can drive the motor by operating the main body after putting food in the container, and the blade is rotated by the driving of the motor to crush the food.

Such a blender has recently been developed as a large-capacity blender having a large container size, and a blender using a motor rotated at ultra-high speed to be capable of crushing various foods more effectively has been developed.

In addition, the blender may have various manipulation structures to facilitate a grinding operation of various foods.

U.S. patent Ser. No. 10/051,998 discloses a container of a blender in which the opened upper surface is shielded by a lid. In addition, the lid may be fixedly mounted on an upper end of the container and be fixed by a separate fixing member to prevent the lid from being easily peeled off or food inside the container from being scattered and splashed to the outside. In addition, an opening is formed in the center of the lid, and the opening may be shielded by a detachable cap.

The user may open the cap without opening the lid to add food to the inside of the container or take action. The cap may completely shield the opening of the lid so that food inside the container does not splash out.

Meanwhile, if the container is shielded to be completely sealed by the lid and the cap, there is a problem in that food inside the container are scattered during the grinding process by a blade rotating at a high speed or the lid or cap is opened by pressure.

In addition, there is a problem in that, in order to prevent any accidental opening of the lid, a constraining structure is required, and, by the opening and closing of the constraining structure, the use thereof becomes cumbersome, and an outer appearance may not be aesthetically pleasing.

SUMMARY

This Summary is provided to introduce a selection of concepts in a simplified form that are further described below in the Detailed Description. This Summary is not intended to identify all key features of the claimed subject matter, nor is it intended to be used alone as an aid in determining the scope of the claimed subject matter.

An object of an embodiment of the present disclosure is to provide a blender and a blender container which may easily detach a lid and improve convenience in use.

An object of an embodiment of the present disclosure is to provide a blender and a blender container which may prevent the lid from being randomly opened and also allow air inside the container to be discharged to the outside.

An object of an embodiment of the present disclosure is to provide a blender and a blender container which facilitate the discharge of air inside the container while not discharging the food inside the container.

A blender according to an embodiment of the present disclosure may include a main body provided with a motor assembly, a container detachably mounted on the main body and having an opened upper surface to form a food receiving space therein, a blade module mounted to penetrate a bottom surface of the container and including a plurality of blades to crush food by rotation, a main lid shielding an opened upper surface of the container and formed with a through-hole which is opened to communicate with the inside of the container, and an auxiliary lid inserted into the through-hole and configured to open and close the through-hole, in which an air vent which may be formed between the auxiliary lid and an inner surface of the through-hole to discharge the air inside the container to the outside is provided, and an inlet and an outlet of the air vent may be disposed on different vertical extension lines based on a bottom surface of the auxiliary lid.

An airtight portion which is formed along a circumferential surface of the auxiliary lid and which is in contact with the inner surface of the through-hole when the auxiliary lid is inserted may be formed, and the air vent may be formed on the airtight portion.

The airtight portion may be formed at a lower end of the auxiliary lid and may have an outer diameter wider as it goes upward.

An air chamber which is recessed inward and in which air discharged past the air vent flows may be formed above the airtight portion.

An auxiliary lid rib protruding outwardly along the circumference of the auxiliary lid may protrude above the air chamber, and a through-hole seating portion on which the auxiliary lid rib is seated when the auxiliary lid is inserted may be formed on the inner surface of the through-hole.

A vent hole from which air in the air chamber is discharged may be formed on the auxiliary lid rib.

The vent hole may be located on an extension line different from the air vent.

The air vent may include an inlet portion including an inlet opening downward to communicate with the inside of the container, an outlet portion including an outlet opening upward from a position spaced apart from the inlet portion, and a connecting portion connecting the inlet portion and the outlet portion to each other.

The inlet portion and the outlet portion may extend in opposite directions from positions spaced apart from each other.

The connecting portion may connect an upper end of the inlet portion and a lower end of the outlet portion and may extend along the circumference of the auxiliary lid.

An auxiliary lid rib which is spaced apart from an upper end of the airtight portion and protrudes along the circumference of the auxiliary lid to shield an opened upper surface of the through-hole may be formed above the air vent, and a vent hole which is opened at a position staggered with the outlet portion to discharge the air discharged from the outlet portion to the outside may be formed on the auxiliary lid rib.

A pair of air vents may be disposed at opposite positions, and the vent hole is disposed in a direction intersecting the position of the air vent and a pair of air vents may be formed at positions facing each other.

The main lid may include an upper body forming an upper shape of the main lid and forming an inner surface of the through-hole, a lower body disposed under the upper body and forming a lower shape of the main lid, and a gasket which is provided between the upper body and the lower body, and which protrudes to the outside to be in close contact with an inner surface of the container.

The lower body may be moved in the vertical direction based on the upper body by rotation, and as the lower body moves in the vertical direction, the gasket may protrude in a radial direction to press against and to be in contact with the inner surface of the container.

A lifting and lowering guide which guides to move the lower body in the vertical direction when the upper body is rotated may be formed on the circumference of the lower body.

A rotation protrusion protruding in the inner direction may be formed on the inner surface of the through-hole, and a rotation groove which extends in an insertion direction of the auxiliary lid and is recessed to insert the rotation protrusion may be formed on an outer surface of the auxiliary lid.

An auxiliary lid rib protruding outward along the circumference of the auxiliary lid may be formed above the rotation groove, and the auxiliary lid rib may be seated in the through-hole when the auxiliary lid is inserted into the through-hole.

A vent hole configured to discharge air discharged through the air vent to the outside may be opened in the upper auxiliary lid rib corresponding to the rotation groove.

The vent hole may be located on a different extension line from the air vent.

A blender according to an embodiment of the present disclosure may include a container which has an opened upper surface and forms a space configured to receive food therein, a blade device mounted to penetrate a bottom of the container and rotated in connection with a motor assembly when the container is mounted, a main lid which is inserted into the opened upper surface of the container, is formed to be in contact with an inner surface of the container, and has a through-hole penetrating in a vertical direction, and an auxiliary lid which is inserted into the through-hole and configured to open and close the through-hole, in which an air vent which is formed between the auxiliary lid and an inner surface of the through-hole to discharge the air inside the container to the outside may be provided, and an inlet and an outlet of the air vent may be disposed on different vertical extension lines based on a bottom surface of the auxiliary lid.

In the blender according to the proposed embodiment, the following effects may be expected. However, effects may not be limited thereto.

According to an embodiment of the present disclosure, a through-hole is formed on a lid for opening and closing the container of the blender, and an auxiliary lid which is inserted into the through-hole to open and close the through-hole may be provided. Through the auxiliary lid, the user may perform various operations such as adding of the food into the container, checking of the state inside the container, and rearrangement of the food, thereby improving convenience in use.

In addition, through the rotational manipulation of the auxiliary lid, the gasket may selectively protrude to closely fix the lid to the inner surface of the container or may allow the lid to be spaced apart therefrom to facilitate separation of the lid therefrom, and thus convenience in the use of opening and closing the lid may be further improved.

In addition, even if the circumference of the main lid is in a sealed state with the container, an air vent is formed between the auxiliary lid and the main lid to allow air inside the container to enter and exit between the auxiliary lid and the through-hole, and thus even if the blade assembly is rotated at a high speed, there is an advantage that it is possible to stabilize the inside of the container and the crushing and processing of food is performed more efficiently.

In particular, by allowing the air to be discharged through the circumference of the auxiliary lid and a portion of the through-hole, there is an advantage that air flow may be achieved while minimizing exposure of the vent hole.

In addition, the air vent is formed in a bent shape several times so that the flow of air through the air vent may be made smoothly, but the food inside the container may be prevented from passing through the air vent. In addition, the space between the air vent and the vent hole are in a state of being separated from each other, and even if some food passes through the air vent, the food may not reach the vent hole and flow down from an inner portion of the air chamber to the container again. Therefore, it is possible to prevent the outer appearance thereof from becoming dirty by preventing food from overflowing or being discharged and smoothly entering and exiting the air inside the container.

In addition, by allowing the air inside the container to be discharged through the air vent and the vent hole in a situation where the pressure inside the container can be increased, there is an advantage that it is possible to prevent the container lid from being randomly opened by pressure.

DETAILED DESCRIPTION

Figure 1:
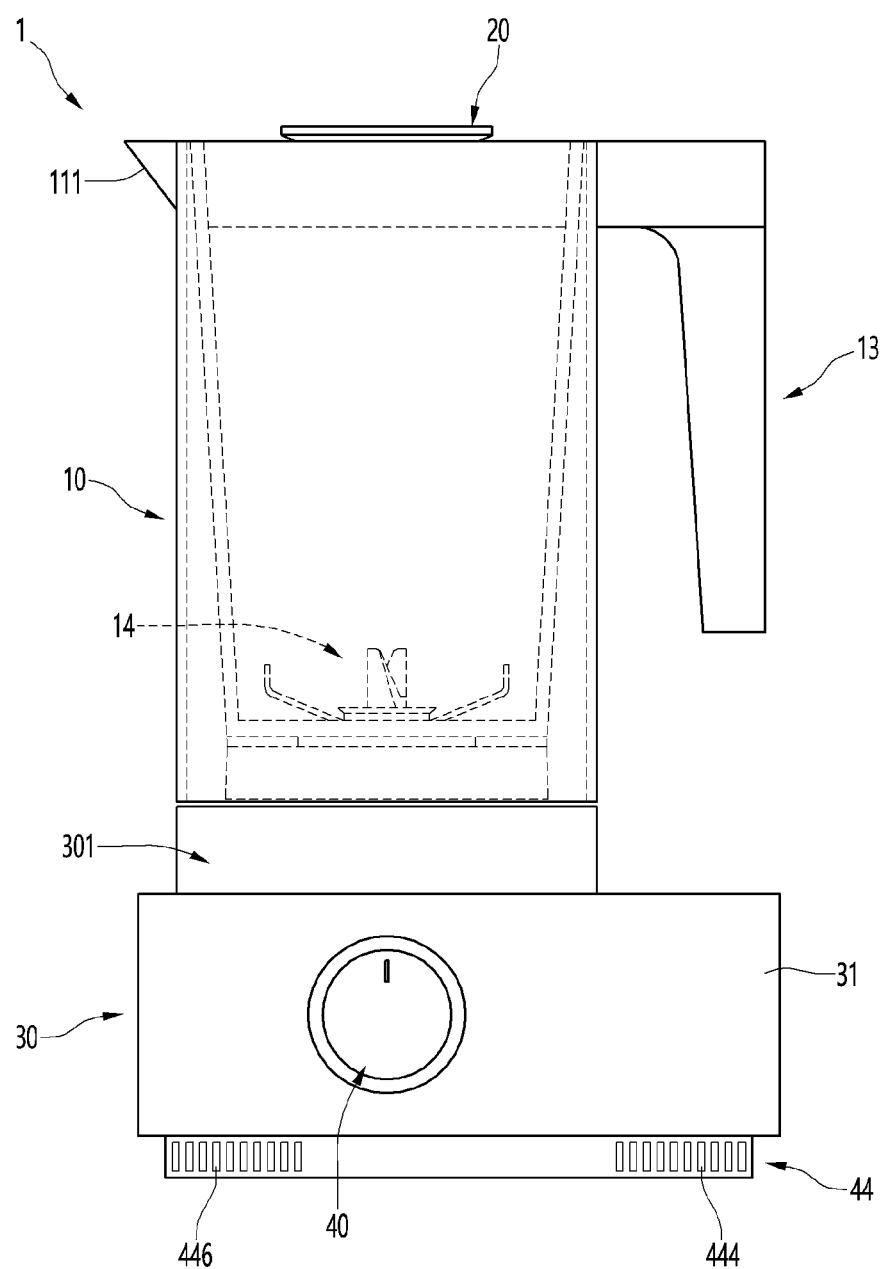
FIG. 1 is a front view illustrating a blender according to a first embodiment of the present disclosure.

For simplicity and clarity of illustration, elements in the figures are not necessarily drawn to scale. The same reference numbers in different figures may denote the same or similar elements, and as such may perform similar functionality. Also, descriptions and details of well-known steps and elements may be omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Spatially relative terms, such as "beneath," "below," "lower," "under," "above," "upper," and the like, may be used herein for ease of explanation to describe one element or feature's relationship to another element or feature as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements includes one or more elements in the list.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Figure 2:
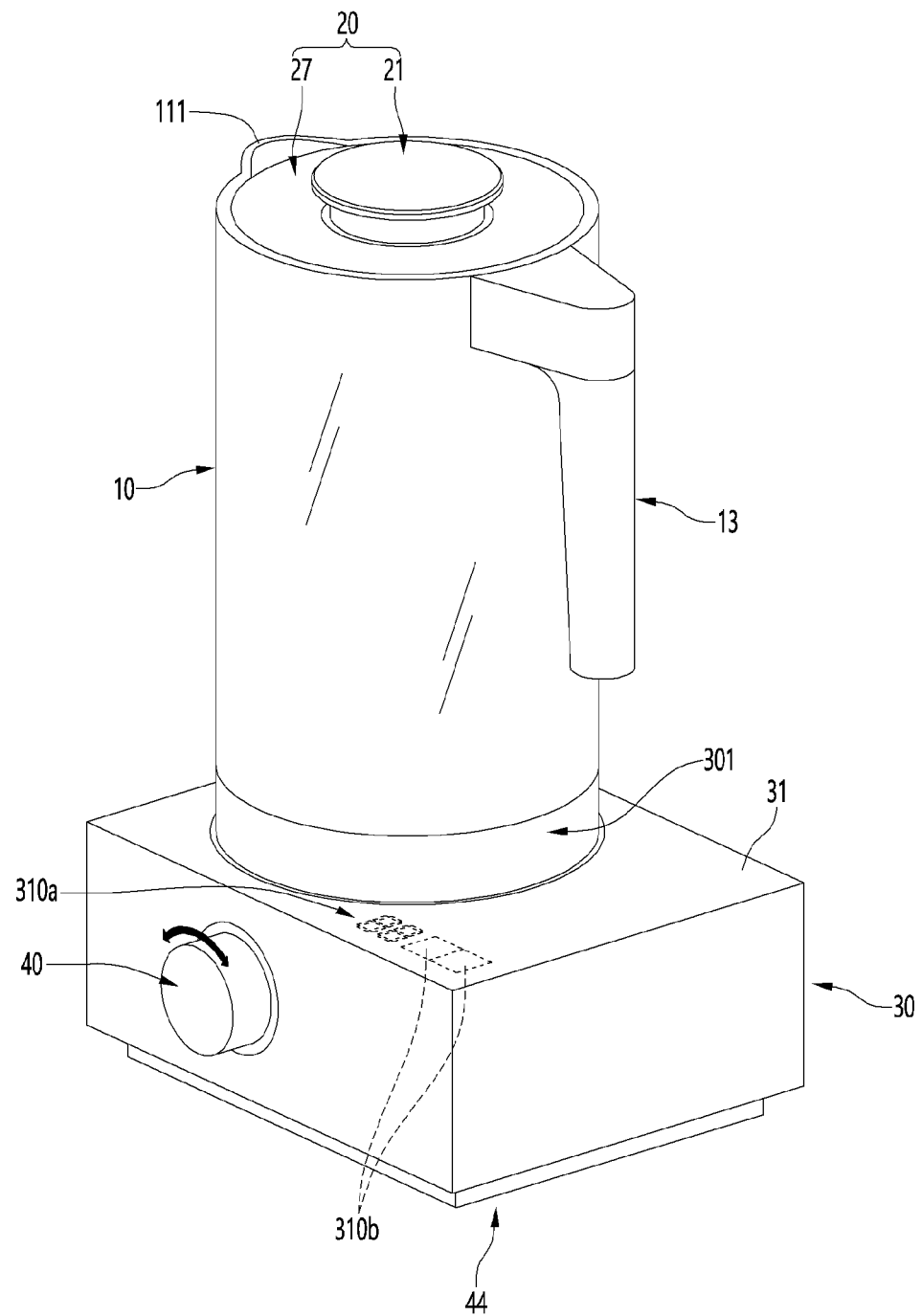
FIG. 2 is a perspective view illustrating the blender.
Figure 3:
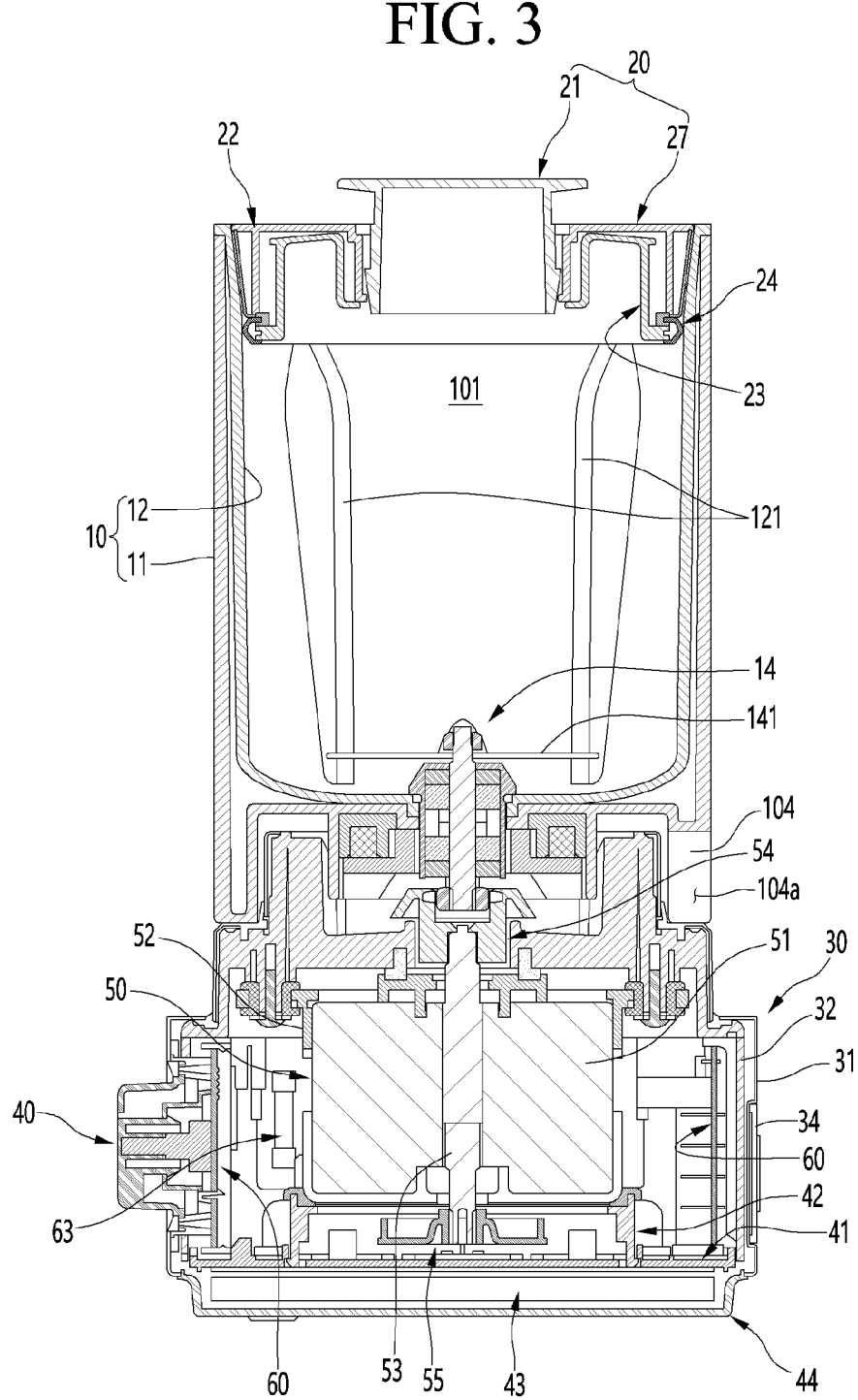
FIG. 3 is a longitudinal cross-sectional view illustrating the blender.
Figure 4:
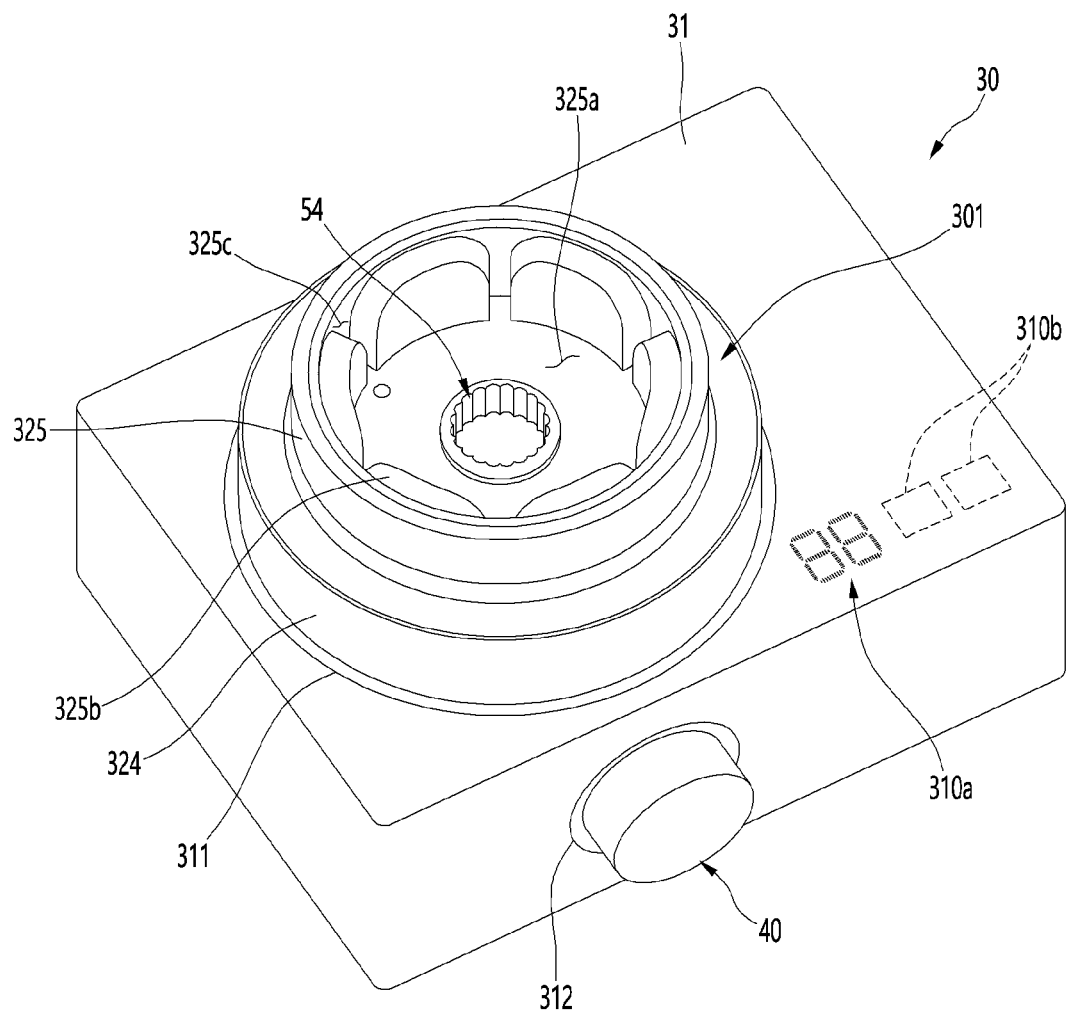
FIG. 4 is a perspective view illustrating a main body that is one component of the blender.

FIG. 1 is a front view illustrating a blender according to a first embodiment of the present disclosure, FIG. 2 is a perspective view illustrating the blender, FIG. 3 is a longitudinal cross-sectional view illustrating the blender, and FIG. 4 is a perspective view illustrating a main body that is one component of the blender.

For the convenience of explanation and understanding, the direction is first defined. The position at which a knob 40 is formed is defined as a front surface or a front side, and the portion to which a rear plate (34 in FIG. 3) is disposed is defined as a rear surface or a rear side. In addition, the position of the bottom of a main body 30 may be referred to as a lower surface or lower side, and the position of the upper end of the container 10 may be referred to as an upper surface or an upper side. In addition, the left side based on the knob 40 may be referred to as a left surface or a left side, and the right side based on the knob 40 may be defined as a right side or a right side.

As illustrated, the blender 1 according to an embodiment of the present disclosure may include the main body 30 and a container 10 seated on the upper portion of the main body 30.

The main body 30 may be provided with electrical devices and components, including a motor assembly 50 and a printed circuit board (PCB) device 60 for the operation of the blender 1. In addition, manipulating portions 40 and 310b for manipulating the operation of the blender 1 and a display portion 310a for displaying operation thereof may be provided.

The main body 30 may be formed in a hexahedral shape as a whole, and a container seating portion 301 for seating the container 10 may be formed on an upper surface of the main body 30. The container seating portion 301 may be configured to detach the container 10 in the vertical direction.

The outer appearance of the main body 30 may be formed by an outer case 31, and the outer case 31 may be formed in a hexahedral shape with a bottom surface open. In addition, an inner case 32 may be formed inside the outer case 31, and space in which the motor assembly 50, the PCB device 60, and the like are mounted may be provided inside the inner case 32.

The internal and overall structure of the main body 30 may be formed by the inner case 32, and the outer case 31 may be mounted on the outside of the inner case 32 to form the outer appearance of the main body 30. The inner case 32 may be injected with a plastic material to provide a structure in which internal and external configurations of the main body 30 can be mounted. In addition, the outer case 31 may be made of a metal material such as stainless steel, and a plate-like material may be bent and bonded to provide a very clean and robust outer appearance shape.

A knob 40 for a user to set the manipulation of the blender 1 may be provided on the front surface of the main body 30. The knob 40 protrudes from the front surface of the main body 30 and can be operated to set the operation of the blender 1 by a rotational manipulation.

A bottom cover 44 may be provided on the lower surface of the main body 30. The bottom cover 44 may be coupled with the outer case 31 and the inner case 32 and may be formed to be in contact with the bottom surface on which the blender 1 is placed. In addition, the bottom cover 44 allows the outer case 31 and the inner case 32 to be spaced apart from the bottom surface, and a cover suction port 444 and a cover discharge port 446 through which cooling air is suctioned and discharged into and out of the main body 30 can be formed.

A display portion 310a for visualizing an operation state of the blender 1 may be provided on the upper surface of the main body 30. For example, the display portion 310a may have a shape such as at least one seven-segment display. In addition, a touch manipulating portion 310b capable of manipulating the start or stop of the blender 1 operation may be provided on an upper surface of the main body 30. For manipulation of the blender 1, the manipulating portions 40 and 310b may include at least one of the knob 40 and the touch manipulating portion 310b.

In addition, a seating portion 301 may be formed on the upper surface of the main body 30. In detail, an upper surface opening 311 may be formed on the upper surface of the outer case 31. The upper surface opening 311 may be formed to have a diameter equal to or slightly larger than the outer diameter of the container seating portion 301. Accordingly, when the inner case 32 and the outer case 31 are coupled, an upper portion of the inner case 32 forming the container seating portion 301 may penetrate the upper surface opening 311 and be exposed to the outside of the outer case 31.

The container seating portion 301 may protrude from the upper surface of the main body 30, and a portion of the container seating portion 301 may be inserted into the lower surface of the container 10 to stably support the container 10. If the container 10 is seated on the container seating portion 301, the motor assembly 50 and the blade device 14 inside the container 10 are coupled to each other to transmit the rotational force to the blade device 14.

The outer appearance of the container seating portion 301 may also be made of the same material as the outer case 31. The container seating portion 301 may be made of a metal material or a material having a metal texture to have a sense of unity with the outer appearance of the main body.

The container seating portion 301 may be formed with a first seating portion 324 and a second seating portion 325 formed stepwise in the vertical direction. The second seating portion 325 may be formed to have a smaller outer diameter than the first seating portion 324.

The second seating portion 325 may extend upward from the upper surface of the first seating portion 324, and an insertion space 325a in which a container coupling portion 103 (see FIG. 7) may be received may be formed therein. A coupling support portion 325b and a container coupling groove 325c may be formed on the inner circumferential surface of the insertion space 325a.

The coupling support portion 325b may form at least a portion of the inner circumferential surface of the second seating portion 325. In addition, when the container 10 is mounted, the coupling support portion 325b is protruded to support the outer surface of the container coupling portion 103. A plurality of the coupling support portion 325b may be spaced apart, and the guide coupling groove 325c may be formed between neighboring coupling support portions 325b.

Therefore, if the container 10 is mounted on the container seating portion 301, the container coupling portion 103 may be mounted in an aligned state by the guide coupling groove 325c. In addition, the coupling support portion 325b may support the outer surface of the container coupling portion 103 so that the container 10 is maintained in a securely mounting state while being mounted on the container seating portion 301. Therefore, the container 10 does not topple in the mounted state and stable operation thereof may be ensured.

The motor assembly 50 may be mounted inside the main body 30 under the container seating portion 301. The motor assembly 50 is for rotation of the blade device 14 inside the container 10 and the blade device can be rotated at a high speed. In addition, the motor assembly 50 can adjust the rotational speed according to the manipulation of the knob 40.

The upper end of the motor assembly 50 may be connected to the blade device 14 inside the container 10. In addition, a cooling fan 55 may be provided at a lower end of the motor assembly 50, and when the motor assembly 50 is driven, the cooling fan 55 can rotate simultaneously with the blade device 14 to force the flow of cooling air inside the main body 30.

Meanwhile, a plurality of PCB devices 60 may be disposed on the inner wall surface of the inner case 32 forming the inner surface of the main body 30. A plurality of PCB devices 60 may be provided and may be disposed on the circumference of the inner surface of the main body 30, that is, on the front surface and the rear surface, and both left and right surfaces thereof, respectively.

In addition, the opened lower surface of the inner case 32 may be shielded by a base plate 41. In addition, an air guide 42 for guiding the discharge of cooling air suctioned by the cooling fan 55 may be provided on the base plate 41.

The predetermined space may be formed between the base plate 41 and the bottom cover 44, and, in one embodiment, a wireless power device 43 may be provided between the base plate 41 and the bottom cover 44. The wireless power device 43 is capable of supplying power to the motor assembly 50 in a wireless manner using induced electromotive force.

Meanwhile, the container 10 may be formed in a cylindrical shape corresponding to the outer diameter of the container seating portion 301, and the upper surface of the container is opened to form a food receiving space therein. The container 10 may be made of glass or a material that can seen through to the inside. For example, the container 10 may be made of a tritan material that is transparent yet resistant to impact and generates very little scratches.

The container 10 may be provided with the blade device 14 at the center of the inner lower surface. The blade device 14 includes a plurality of blades 141 and may be connected to the motor assembly 50. Therefore, when the motor assembly 50 is driven in a state where the container 10 is seated on the main body 30, the blades 141 may be rotated to crush or cut food inside the container 10.

In addition, a plurality of inner guides 121 for guiding food to be rotated may be formed inside the container 10. The inner guide 121 may extend upward from a lower end of the inner surface of the container 10 to a predetermined length and may extend to a lower surface of the lid 20 when the lid 20 is mounted.

Meanwhile, a spout 111 that can pour the crushed food may protrude from the upper end of the container 10, and a handle 13 may protrude from one side facing the spout 111. The handle 13 protrudes outward from the upper end of the container 10 and then extends downward to allow the user to lift or move the container 10. The protruding end portion of the handle 13 may be located on the same extension line as the side end of the main body 30.

In addition, the lid 20 may be mounted on the opened upper surface of the container 10. The lid 20 may shield the opened upper surface of the container 10, and the user holds the auxiliary lid 21 in the center thereof and separates the lid 20 from the container 10 to open and close the opened upper surface of the container 10.

The lid 20 may include a main lid 27 that shields the upper surface of the container 10 and an auxiliary lid 21 in the center of the main lid 27. In addition, a lid gasket 24 may be provided along the circumference of the lid 20.

Hereinafter, a structure of the container 10 will be described in more detail, with reference to the drawings.

Figure 5:
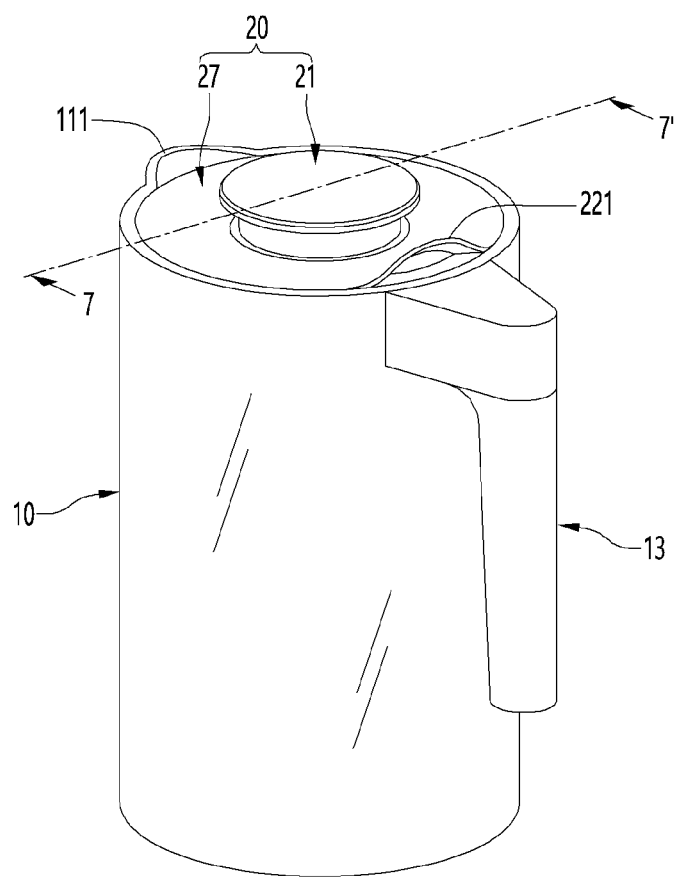
FIG. 5 is a perspective view illustrating a container that is one component of the blender.
Figure 6:
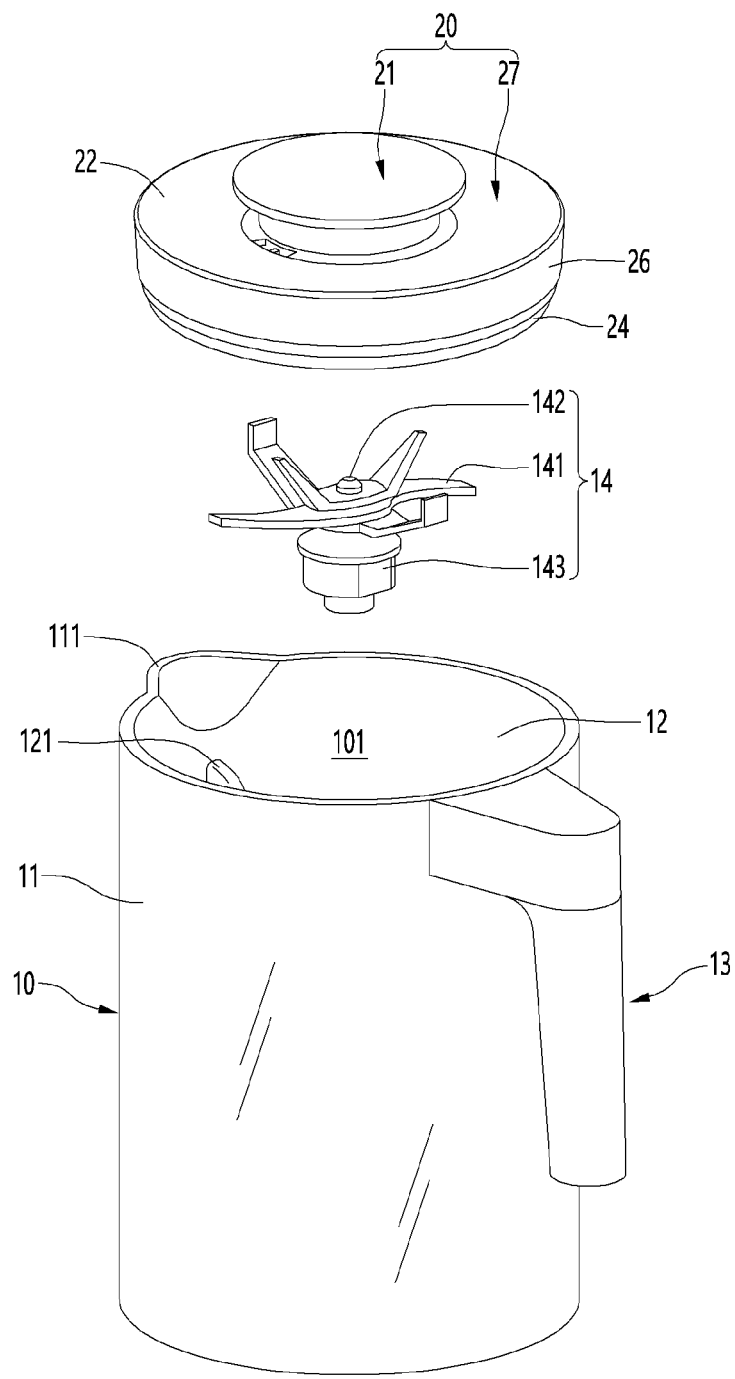
FIG. 6 is an exploded perspective view illustrating the container.
Figure 7:
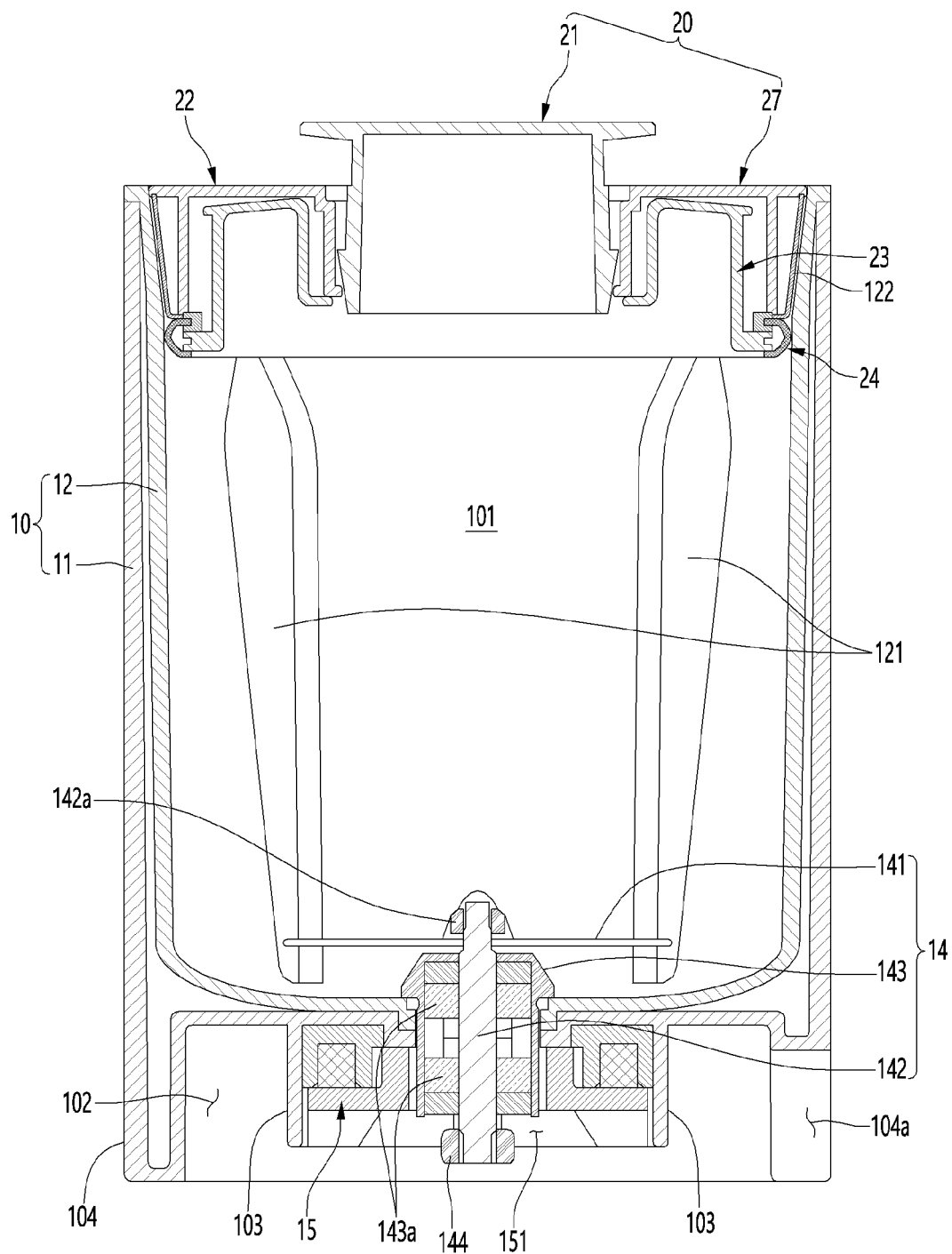
FIG. 7 is a cross-sectional view taken along line 7-7' of FIG. 5.

FIG. 5 is a perspective view illustrating a container that is one component of the blender, FIG. 6 is an exploded perspective view illustrating the container, and FIG. 7 is a cross-sectional view taken along line 7-7' of FIG. 5.

As illustrated in the drawing, the container 10 is formed in a cylindrical shape with an opened upper surface. In addition, a blade device 14 is mounted on the lower surface of the container 10, and the lid 20 may be detachably mounted on the opened upper surface of the container 10.

The container 10 may be made of a material such as glass, tritan, or transparent plastic to check a state of the food inside the container during the operation of the blender 1. In addition, the container 10 may include an outer container 11 forming an outer shape and an inner container 12 forming an inner space in which food is received.

The inner container 12 and the outer container 11 are coupled with each other to form the overall shape of the container 10, and the container 10 may have a double-wall structure. In certain embodiments, a single-wall structure may be used.

In detail, the inner container 12 may be spaced apart from the outer container 11 to form a space between the outer container 11 and the inner container 12. The inner container 12 may have a smaller diameter as it goes downward. The lower portion of the inner container 12 is formed to be inclined or rounded towards the blade device 14 so that the food in the container 10 is directed to the blade device 14.

Meanwhile, the upper end of the inner container 12 may be formed to have an inclined surface 122 whose inner diameter becomes narrower as it goes downward. Therefore, in the process of inserting the lid 20 into the opened upper surface of the container 10, a structure which is sealed may be formed while the inclined surface 122 and the inner container 12 gradually come in close contact with each other. The inclined surface of the upper end of the inner container 12 may be formed from the upper end of the container 10 to the upper end of the inner guide 121 and may be formed along the inner surface circumference of the container 10. In addition, the inner guide 121 may be formed on the inner surface of the inner container 12. The inner guide 121 may extend from the inclined surface 122 to the bottom surface of the inner container 12.

In addition, the outer container 11 may be formed so that outer diameters of the upper end and the lower end thereof have the same cylindrical shapes, and thus the outer appearance of the container 10 can be seen to be neat. In addition, the outer diameter of the outer container 11 may be formed to be the same as the outer diameter of the container seating portion 301, so that the main body 30 and the container 10 may have a sense of unity in a state where the container 10 is mounted.

In addition, the lower surface of the outer container 11 may be formed with a main body receiving portion 102. The main body receiving portion 102 forms a space recessed upward from the lower surface of the outer container 11 and forms space into which the second seating portion 325 described above may be inserted. By the coupling of the main body receiving portion 102 and the second seating portion 325, the container 10 may maintain a state of being mounted on the container seating portion 301.

A container coupling portion 103 on which the blade device 14 is mounted may be formed at the center of the lower surface of the outer container 11. The container coupling portions 103 may be located on the inner surface of the outer container 11 and the inner center of the body receiving portion 102. The container coupling portion 103 may be formed to protrude downward in a rib shape extending downward about the center of the bottom surface of the container 10. In addition, the container coupling portion 103 does not extend further downward than the lower end of the outer container 11 and provides a space in which the blade device 14 is disposed in the center of the container 10. In addition, the inside of the container coupling portion 103 may have a structure that is fitted to the inside of the container seating portion 301 when the container is seated on the container seating portion 301.

In addition, a lower end support portion 104 may be formed around the lower surface of the container 10. The lower end support portion 104 may be spaced apart from the circumference of the container coupling portion 103, and the main body receiving portion 102 may be formed between the lower end support portion 104 and the container coupling portion 103. The main body receiving portion 102 forms a space into which an upper end of the container seating portion 301 may be inserted.

The lower end support portion 104 may be formed by extending the outer container 11 downward and form a circumference of the lower end of the container 10. In addition, the lower end support portion 104 may be formed by a shape in which the outer container 11 is bent inward.

The lower end of the lower end support portion 104 may be formed to have a predetermined thickness and may be supported by the stepped container seating portion 301. In addition, the outer surface of the lower end support portion 104 may be located on the same plane as the outer surface of the container seating portion 301, and in a state where the container 10 is mounted on the container seating portion 301, the container 10 and the main body 30 may have a sense of unity.

The lower end support portion 104 may extend further downward than the lower end of the container coupling portion 103. Therefore, it is possible to prevent the container coupling portion 103 from interfering with the container seating portion 301 before the container 10 is completely mounted on the main body 30. In addition, when the container 10 is placed on the bottom surface in a separated state, the container coupling portion 103 may be spaced apart from the bottom surface, and the lower end support portion 104 contacts with the bottom surface, so that the container 10 may maintain a state of being stably supported.

Meanwhile, an air vent 104a may be formed on the lower end support portion 104. The air vent 104a forms a passage through which air between the lower surface of the container 10 and the upper surface of the container seating part 301 enters and exits when the container 10 and the seating portion 301 are coupled to each other or separated from each other so that the container 10 can be easily mounted on and separated from the container seating portion 301.

Meanwhile, the lower surface of the container 10 may be provided with the blade device 14 in the center thereof. The blade device 14 is for crushing the food received in the inner space 101 of the container 10 and may include a plurality of blades 141, a blade shaft 142, and a shaft mounting member 143.

The plurality of blades 141 may be extended in different directions from each other, the plurality of blades may be configured in combination, and the plurality of blades 141 may be radially disposed about the blade shaft 142. The blade 141 may be formed to be symmetrical about the blade shaft 142, and extension directions, bending angles, and shapes of the plurality of blades 141 may be formed differently, respectively. In other words, the blades 141 of various shapes may be combined to be suitable for both grinding and cutting various foods and making foods into a powder or a liquid.

The blade shaft 142 is mounted to penetrate the shaft mounting member 143 and may be supported by a bearing 143a constituting the shaft mounting member 143. A plurality of bearings 143a may be disposed in the vertical direction and may support so that the blade shaft 142 can be stably rotated. In addition, the shaft mounting member 143 may be securely fixed through the bottom surface of the container 10.

A blade constraining member 142a for preventing the separation of the blade 141 and maintaining a state where the blade 141 is fixed to the blade shaft 142 may be fastened to the upper end of the blade shaft 142.

In addition, a blade-side connecting portion 144 may be formed on the lower end of the blade shaft 142. The blade-side connecting portion 144 may be exposed at the center of the bottom surface of the container 10 and may protrude downward. Therefore, when the container 10 is mounted on the container seating portion 301, the blade-side connecting portion 144 is connected to the motor-side connecting portion 54 so that the power of the motor assembly 50 may be transmitted.

Meanwhile, the container coupling portion 103 may be formed on the bottom surface of the container 10, and a mounting cover 15 may be provided inside the container coupling portion 103. The mounting cover 15 forms a receiving space 151 in which the motor-side connecting portion 54 may be received when the container 10 is mounted on the container seating portion 301.

In other words, the center of the mounting cover 15 may be opened to be penetrated by the shaft mounting member 143, and the blade-side connecting portion 144 may be exposed through the center of the lower surface of the mounting cover 15. In addition, the central portion of the mounting cover 15 corresponding to the circumference of the blade-side connecting portion 144 is recessed, and thus is formed so that the motor-side connecting portion 54 is received.

Therefore, in the process in which the container 10 is seated on the container seating portion 301, the motor-side connecting portion 54 and the blade-side connecting portion 144 do not interfere with each other and have a structure that can be naturally coupled to each other.

Meanwhile, the lid may open and close the opened upper surface of the container and, in the mounted state, may be in close contact with the circumferential surface of the container.

The lid 20 may include a main lid 27 for shielding the opened upper surface of the container 10 and an auxiliary lid 21 mounted to penetrate the center of the main lid 27. In addition, a lid gasket 24 may be provided around the lid 20 to be in contact with the inner surface of the container 10 to seal the inside of the container 10. Therefore, the lid 20 can be inserted through the opened upper surface of the container 10, and the lid gasket 24 is in contact with the inclined surface 122 of the container to maintain airtightness while the lid 20 is mounted. In addition, the lid gasket 24 may be pressed against and be in close contact with the inner surface of the container 10 to prevent the lid 20 from being unintentionally separated from the container.

Hereinafter, the structure of the lid 20 will be described in more detail, with reference to the drawings.

Figure 8:
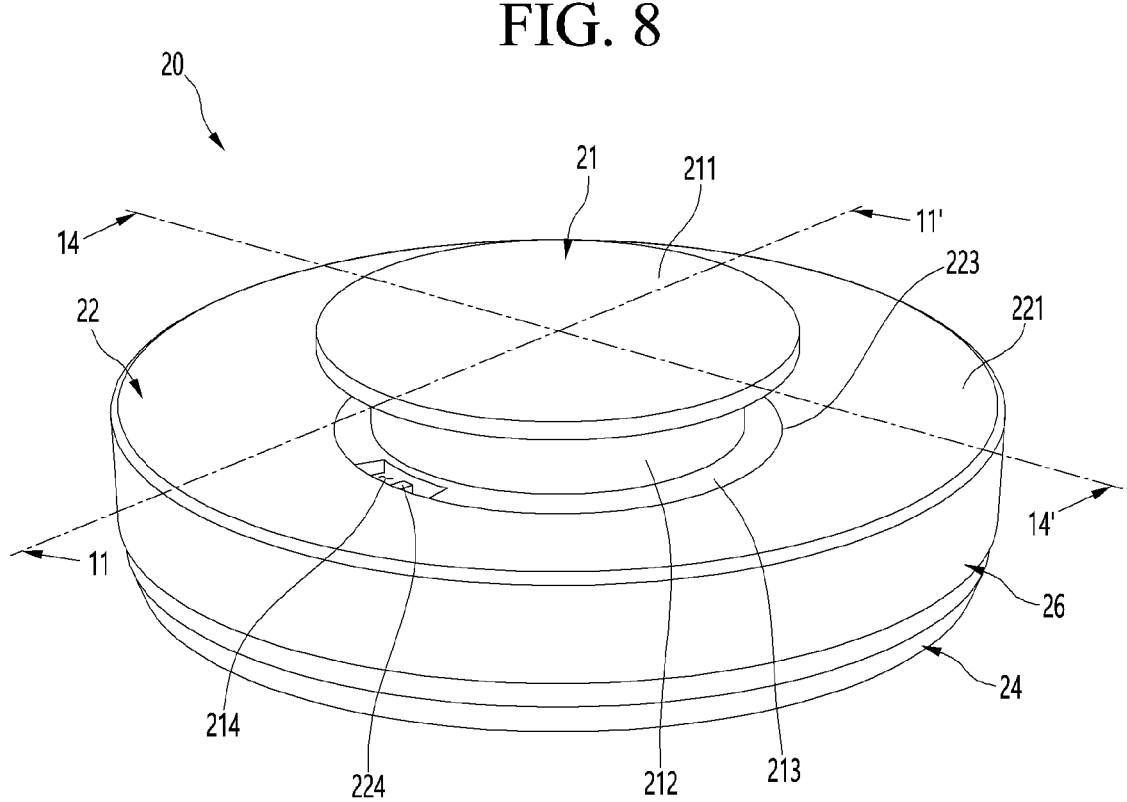
FIG. 8 is a perspective view illustrating a lid according to an embodiment of the present disclosure.
Figure 9:
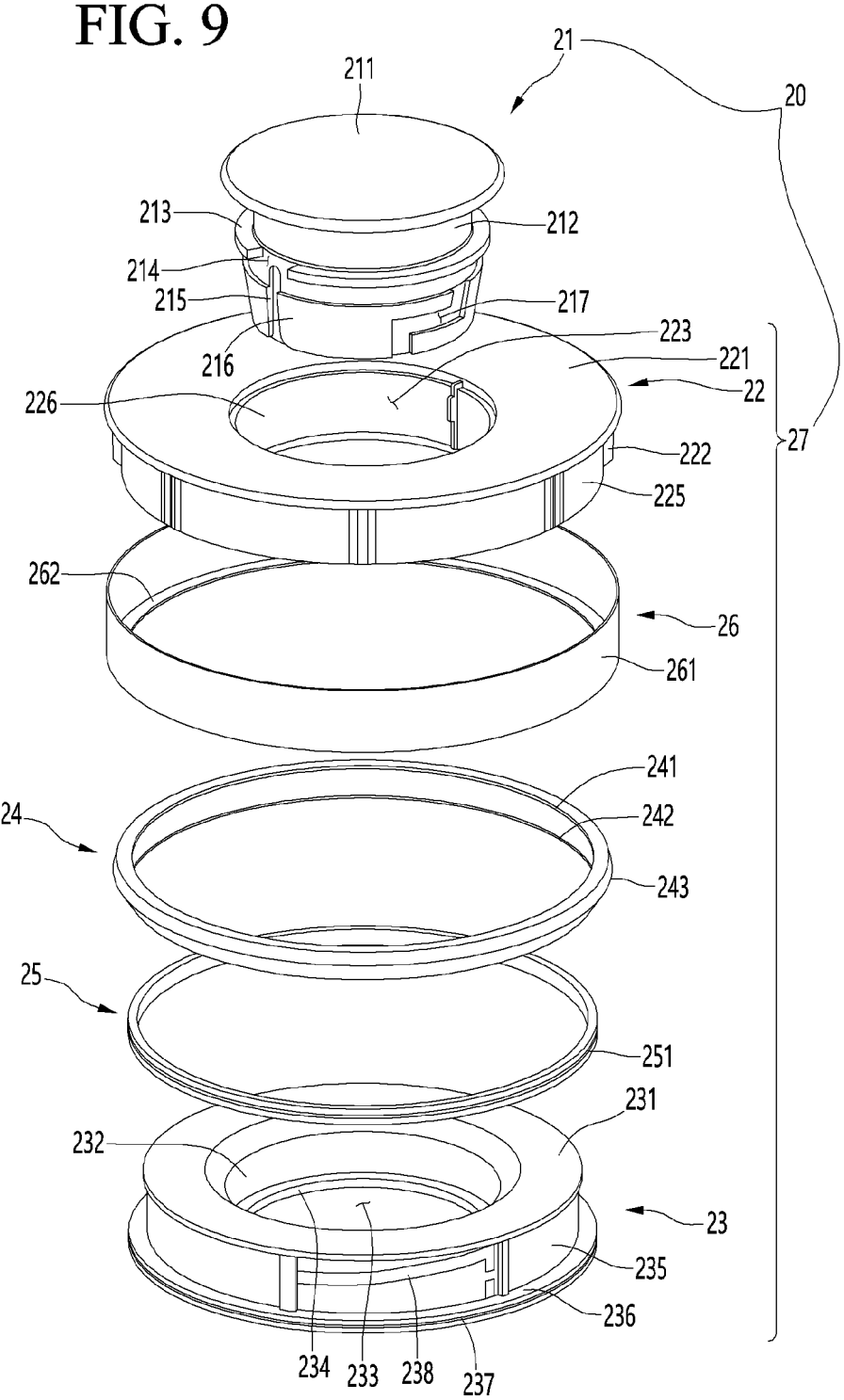
FIG. 9 is an exploded perspective view illustrating the lid.
Figure 10:
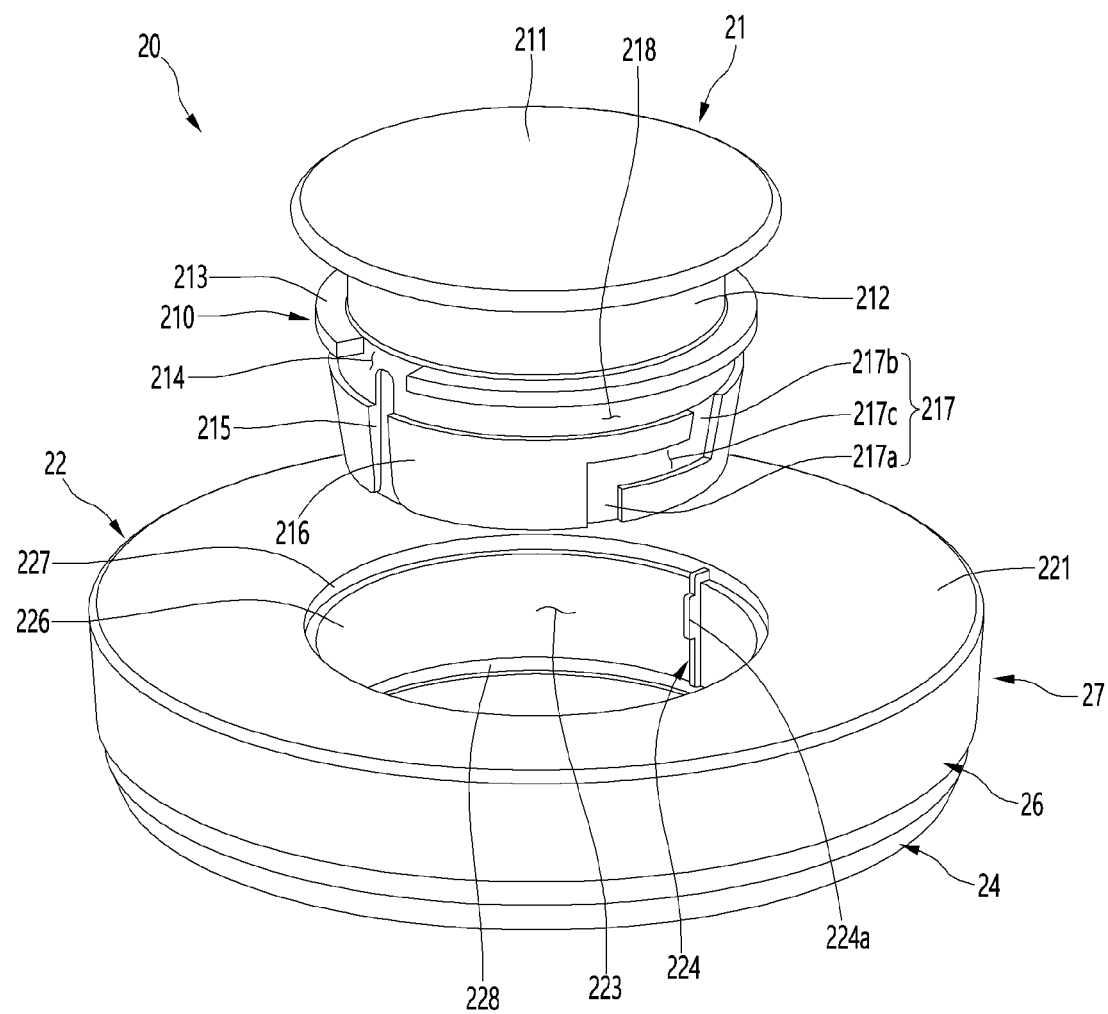
FIG. 10 is a perspective view illustrating a state where the auxiliary lid is separated from the main lid constituting the lid.
Figure 11:
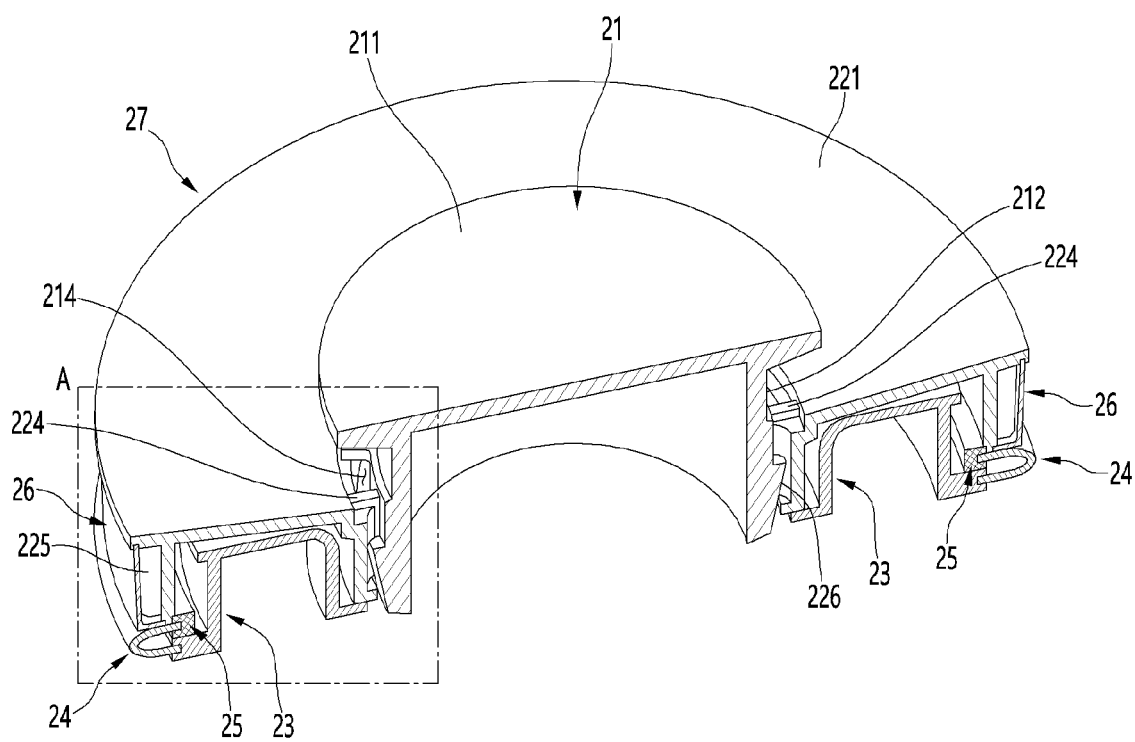
FIG. 11 is a cutaway perspective view taken along line 11-11' of FIG. 8.
Figure 12:
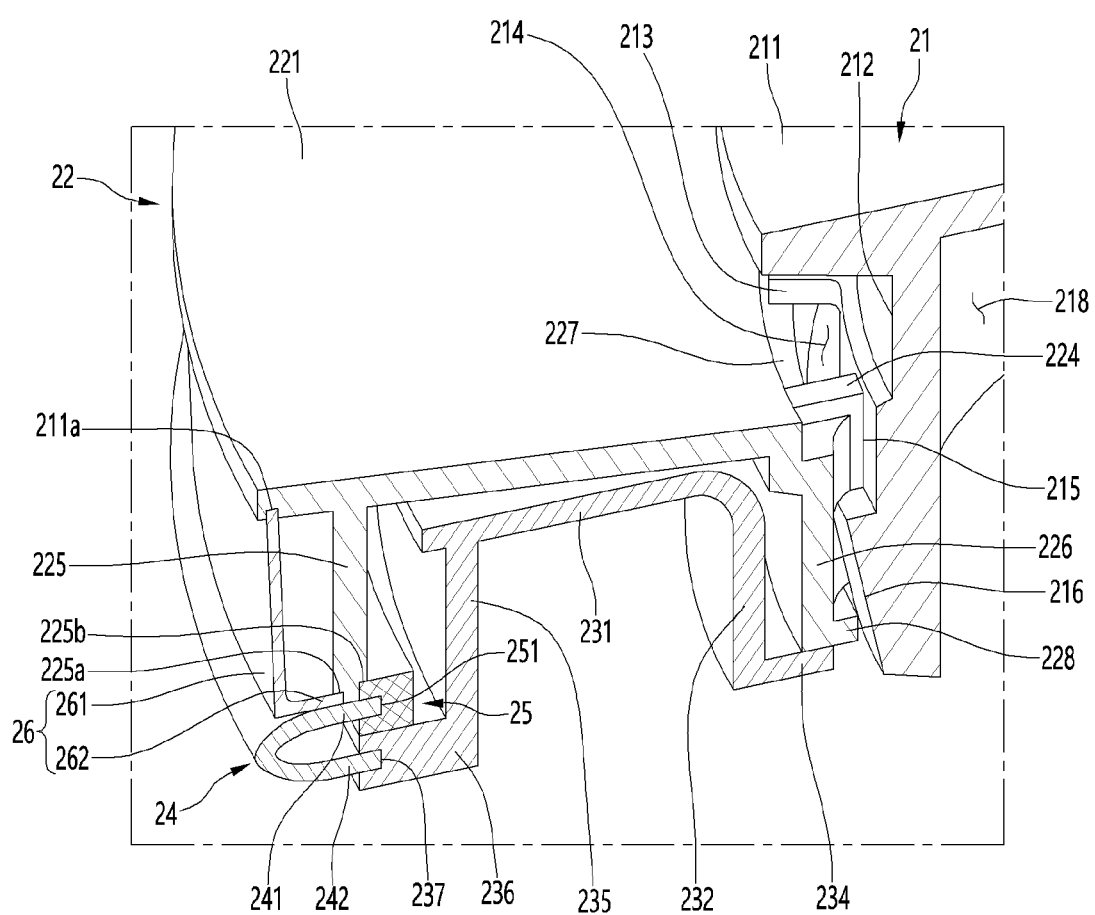
FIG. 12 is an enlarged view illustrating part A of FIG. 11.

FIG. 8 is a perspective view illustrating a lid according to an embodiment of the present disclosure, FIG. 9 is an exploded perspective view illustrating the lid, FIG. 10 is a perspective view illustrating a state where the auxiliary lid is separated from the main lid constituting the lid, FIG. 11 is a cutaway perspective view taken along line 11-11' of FIG. 8, and FIG. 12 is an enlarged view illustrating part A of FIG. 11.

The lid 20 may be inserted inside the opened upper surface of the container 10 as a whole and may shield the opened upper surface of the container 10. In addition, in a state where the lid 20 is inserted, the upper end of the main lid 27 and the upper surface of the container 10 may be configured to be in the same plane.

The lid 20 may include a main lid 27 and an auxiliary lid 21. The main lid 27 may substantially open and close the opened upper surface of the container 10. In addition, the auxiliary lid 21 may be called a cap or a stopper to open and close a through-hole 223 penetrating the main lid 27. In a state where the upper surface of the container 10 is shielded by the main lid 27, the user may separate the auxiliary lid 21 which shields the through-hole 223 and can access the inside of the container 10.

The main lid 27 may be formed in a disc shape having an outer diameter corresponding to the inner diameter of the opened upper surface of the container 10. In addition, the main lid 27 is formed to have a predetermined thickness in the vertical direction to be in close contact with the inner surface of the container 10.

In addition, the through-hole 223 may be formed in the center of the main lid 27. The through-hole 223 may be formed in a shape that penetrates the main lid 27 in the vertical direction to connect the upper and lower surfaces of the main lid 27.

The auxiliary lid 21 may protrude upward in a state of being mounted in the through-hole 223 in the center of the main lid 27, and, in a state where the user holds the auxiliary lid 21, the manipulation of main lid 27 to open and close the opened upper surface of the container 10 may be performed.

The main lid 27 may include an upper body 22 forming an upper outer appearance and a lower body 23 provided below the upper body 22 to form a lower outer appearance of the lid 20. In addition, the main lid 27 may include a deco plate 26 that forms a circumferential outer appearance of the lid 20, and a gasket 24 that seals between the lid 20 and the container 10.

In detail, the upper body 22 may include a top plate 221 which forms an outer appearance of an upper surface, and in which the through-hole 223 is opened in the center thereof, an upper inner part 226 extending downward along the inner circumferential of the top plate 221, and an upper outer part 225 extending downward along an outer circumference of the top plate 221.

The top plate 221 may form an upper surface of the main lid 27 and form most of the outer appearance exposed to the outside of the lid 20. In addition, the upper inner part 226 may extend vertically downward from the inner circumference of the top plate 221. The upper end of the upper inner part 226, that is, the upper end of the through-hole 223 may be formed stepwise, and a through-hole seating portion 227 may be formed so that a lid rib 213 to be described below may be seated.

In addition, a rotation protrusion 224 protruding inward into the through-hole 223 may be formed on the inner surface of the upper inner part 226. The rotation protrusion 224 extends longitudinally in the vertical direction and may extend from the upper end to the lower end of the upper inner part 226. The rotation protrusion 224 may be formed in a form that can be inserted into a rotation groove 215 of the auxiliary lid 21 to be described below.

In addition, the rotation protrusion 224 may be further formed with a lid constraining portion 224a further protruding inward into the through-hole 223. The lid constraining portion 224a is formed to be locked and constrained inside the rotation groove 215, so that when the auxiliary lid 21 is lifted upward, the main lid 27 may be lifted together by maintaining a state where the lid constraining portion 224a is constrained inside the rotation groove 215. Of course, if the auxiliary lid 21 is lifted with a force equal to a predetermined force or more, the rotation protrusion 224 may separate from the rotation groove 215 so that the main lid 27 and the auxiliary lid 21 is separated.

A plurality of rotation protrusions 224 may be formed and may be disposed at positions facing each other. In addition, the rotation protrusion 224 may be positioned at a position corresponding to the rotation groove 215, and when the auxiliary lid 21 is mounted to the through-hole 223, the rotation protrusion 224 may be inserted into the inside of the rotation groove 215.

In addition, the upper inner part 226 may extend to a lower end of the lower body 23. An inner lower end portion 228 protruding inward towards the through-hole 223 may be formed at a lower end of the upper inner part 226. The inner lower end portion 228 may extend in an inner direction and may be in contact with an inclined surface of an airtight portion 216 formed around the lower portion of the auxiliary lid 21. Therefore, it is possible to prevent the food inside the container 10 from escaping to the outside during the operation of the blade device 14 by allowing the auxiliary lid 21 and the main lid 27 to be in close contact with each other.

In addition, although not illustrated in detail, when the upper body 22 is rotated, the guide protrusion (not illustrated) which is moved along a lifting and lowering guide portion 238 (see FIG. 9) may be formed to protrude from the inside of the upper outer part 225. As an example, a pair of guide protrusions may be provided on the inner surface of the upper outer part 225 and may protrude in directions facing each other. In addition, a pair of lifting and lowering guides 238 may be formed on the outer surface of the lower body 23 each facing the respective guide protrusion to guide the movement of the guide protrusion. According to the rotational direction of the upper body 22, the upper body 22 may move up or down relative to the lower body 23.

The upper outer part 225 is formed at a position slightly spaced inward from the outer end of the top plate 221 and may extend downward along the circumference of the top plate 221. In addition, the upper outer part 225 may extend in a direction perpendicular to the top plate 221 and may extend to a position spaced apart from the lower body 23.

A number of support ribs 222 may be formed around the upper outer part 225. The support rib 222 extends from the upper end to the lower end of the upper outer part 225, and a plurality of upper ribs 222 may be formed on the outer surface of the upper outer part 225 at regular intervals. The support rib 222 is for supporting the deco plate 26 mounted on the upper outer part 225 from the inside and supports so that the deco plate 26 made of a metal plate does not get deformed.

The support rib 222 may protrude less than the outer circumferential surface of the top plate 221. Then, the deco plate 26 may be formed to have a size corresponding to the upper outer part 225. Therefore, the deco plate 26 may form a circumferential surface of the upper body 22 while seated on the support rib 222.

The deco plate 26 may be made of a metal material, and, for example, may be formed of a plate-shaped stainless material. The deco plate 26 may be composed of a side surface portion 261 forming a side surface of the upper body 22 and a lower surface portion 262 that is bent inward from the lower end of the side surface portion 261 to be in contact with the gasket 24. In addition, the upper end of the side surface portion 261 may be fixed to an upper plate groove 211a formed on the lower surface of the outer end of the top plate 221. In addition, the outer end of the lower surface portion 262 may be fixed to a lower plate groove 225a formed at the lower end of the upper outer part 225. In other words, the deco plate 26 is fixedly mounted around the upper body 22 and forms the upper body 22, that is, the outer appearance of the circumferential surface of the main lid 27.

Meanwhile, a gasket fixing member 25 may be provided at a lower end of the upper body 22. The gasket fixing member 25 may be provided at a lower end of the upper body 22, that is, a lower end of the upper outer part 225, and an upper end of the gasket 24 may be fixed thereto.

In detail, the gasket fixing member 25 may be disposed along the lower end of the upper outer part 225 and may be inserted into a fixing member mounting portion 225b formed stepwise at the lower end of the upper outer part 225. At this time, The fixing member mounting portion 225b may hold the gasket fixing member 25 to the upper outer part 225 which is in a state of being capable of rotating. In other words, the gasket fixing member 25 in a state where the gasket 24 is mounted supports the upper body 22 from below, and the upper body 22 may be supported in a rotatable state, and when the upper body 22 is rotated, the gasket fixing member 25 remains stationary and only the upper body 22 is rotated.

The gasket 24 is disposed at the lower end of the circumference of the lid 20 and may be made of a material having elasticity. In the gasket 24, a central portion 243 may protrude outward, and the protruding central portion 243 contacts with the inner surface of the container 10 to seal the space between the container 10 and the lid 20.

The gasket 24 may be composed of a gasket upper portion 241 and a gasket lower portion 242 based on the center thereof. End portions of the gasket upper portion 241 and the gasket lower portion 242 may extend inward, respectively.

The extended end portion of the gasket upper portion 241 may be fixed by being inserted into the upper fixing groove 251 of the gasket fixing member 25. In addition, the extended end portion of the gasket lower portion 242 may be fixed by being inserted into the lower fixing groove 237 formed at the lower end of the lower body 23. Therefore, as the upper body 22 or the lower body 23 moves in the vertical direction, the gasket upper portion 241 and the gasket lower portion 242 are brought closer to or farther from each other, and the central portion of the gasket 24 may optionally protrude to the outside. For example, as illustrated in FIG. 12, when the lower body 23 is positioned at the uppermost position, the protruding central portion 243 of the gasket 24 protrudes most outward, and in this case, the inner surface of the container 10 and the gasket 24 are completely in close contact with each other to maintain airtightness and prevent the lid 20 from being disassembled from the container 10. On the other hand, when the upper body 22 is rotated in the state of FIG. 12 and the lower body 23 moves downward relatively, the central portion 243 of the gasket 24 is relatively protruding less, and in this case, the inner surface of the container 10 and the gasket 24 may be separated from each other or the contact may be loose, and the lid 20 may be easily separated from the container 10.

The lower body 23 is provided below the upper body 22 and may be formed in a circular shape with a center opening corresponding to the through-hole 223. In addition, the lower body 23 may be formed in a structure in which at least a portion is received in the recessed inner space of the upper body 22.

In detail, the lower body 23 may include a lower plate 231 forming an upper surface of the lower body 23, a lower inner part 232 extending downward from an inner end of the lower plate 231, and a lower outer part 235 extending downward from an outer end of the lower plate 231.

The lower plate 231, the lower inner part 232, and the lower outer part 235 may be received inside a space formed by the top plate 221, the upper inner part 226, and the upper outer part 225 of the upper body 22. In addition, the upper body 22 and the lower body 23 may be disposed to rotate relative to each other.

The lower plate 231 may be disposed in parallel with the top plate 221. In addition, the lower inner part 232 and the lower outer part 235 may be formed to extend further downward than the upper inner part 226 and the upper outer part 225.

The lower inner part 232 may extend downward along the inner end of the lower plate 231 and may extend parallel to the upper inner part 226. In addition, an inner support portion 234 extending inward towards the through-hole 223 may be formed at a lower end of the lower inner part 232. The inner support portion 234 is vertically bent from the lower end of the lower inner part 232 to allow the inner lower end portion 228 of the upper inner part 226 to be seated on its upper surface. In other words, the inner lower end portion 228 is seated on the inner support portion 234 at a position where the upper body 22 is lowest with respect to the lower body 23, thereby supporting the upper body 22 so that the upper body 22 can no longer move downward.

The lower outer part 235 may extend downward along the outer end of the lower plate 231. The lower outer 235 part is disposed parallel to the upper outer part 225 and may extend further downward than the upper outer part 225. In addition, an outer support portion 236 may be formed at an extended end portion of the lower outer part 235.

The outer support portion 236 is vertically bent outward from the lower end of the lower outer part 235 and extends outwardly to support the lower surface of the gasket fixing member 25. In other words, the protruding end portion of the outer support portion 236 may be located at a position corresponding to the outer end of the gasket fixing member 25. In addition, a lower fixing groove 237 into which the gasket lower portion 242 is inserted and to which the gasket lower portion 242 is fixed may be formed at the protruding end portion of the outer support portion 236.

As illustrated in FIG. 12, when the upper body 22 and the lower body 23 is closest, that is, when the upper body 22 is in the lowest position with respect to the lower body 23, the inner support portion 234 may support the inner lower end portion 228 from below, and the outer support portion 236 may support the gasket fixing member 25 from below.

Hereinafter, it will be described with respect to the auxiliary lid 21.

The auxiliary lid 21 may include a lid upper surface portion 211 forming an upper surface and a lid body 210 extending downward from the lid upper surface portion 211. The lid body 210 may refer to the entire portion extending downward from the lid upper surface portion 211. In addition, the lid body 210 may be removed or inserted into the through-hole 223 to open and close the through-hole 223.

A lid rib 213 may be formed on the auxiliary lid 21. The lid rib 213 may be formed to protrude outward along the circumference of the lid body 210. The lid rib 213 may be configured such that when the auxiliary lid 21 is inserted into the through-hole 223, the lid rib 213 shields the through-hole 223 in a closed state. The lid rib 213 may be formed in a shape corresponding to the through-hole 223.

In addition, the lid rib 213 may be formed with a vent hole 214. The vent hole 214 may be a passage in which a portion of the lid rib 213 is opened and which communicates with the inside of the through-hole 223 while the auxiliary lid 21 is inserted into the through-hole 223. The vent hole 214 may be formed at a position corresponding to the rotation groove 215. If a plurality of the rotation grooves 215 are formed, the vent holes 214 may be formed in the number corresponding to the rotation grooves. In addition, the vent hole 214 may be positioned above the rotation groove 215. A plurality of vent holes 214 may be formed, and the plurality of vent holes 214 may be positioned in opposite directions.

Meanwhile, the lid rib 213 may be seated on a through-hole seating portion 227 when the auxiliary lid 21 is inserted into the through-hole 223. Therefore, the auxiliary lid 21 can be maintained a state of being inserted into and mounted in the through-hole 223. In addition, when the auxiliary lid 21 is mounted, the lid rib 213 and the main lid 27 may be located on the same plane. Then, the vent hole 214 is exposed to the upper surface of the main lid 20 so that the inside air of the container 10 can flow out to the outside.

A body upper portion 212 forming a portion of the outer surface of the lid body 210 is formed above the lid rib 213. The body upper portion 212 supports the lid upper surface portion 211 and may be exposed to the outside even when the auxiliary lid 21 is inserted into the through-hole 223. In addition, a body lower portion 218 forming a portion of the outer surface of the lid body 210 is formed below the lid rib 213. The body lower portion 218 may form an area of the air chamber 218a (see FIG. 15).

In detail, an air chamber 218a may be formed below the lid rib 213. The air chamber 218a may form a space spaced between the auxiliary lid 21 and the inner wall surface of the through-hole 223 and form an exhaust passage of air flowing through an air vent 217. In addition, the air chamber 218a may communicate with a vent hole 214. The air chamber 218a is positioned between the lid rib 213 and an airtight portion 216 and may be formed in a shape that is recessed inward along the outer surface of the lid body 210.

The airtight portion 216 may be formed below the air chamber 218a and at the lower end of the lid body 210. The airtight portion 216 is for primarily shielding a space between the through-hole 223 and the auxiliary lid 21 and may protrude along the circumference of the lid body 210. In other words, when the auxiliary lid 21 is mounted, the through-hole 223 may be primarily shielded by the airtight portion 216, and may be secondarily shielded by lid rib 213 seated on the through-hole seating portion 227.

The airtight portion 216 may be formed to have an inclined surface protruding outward from the lower side to the upper side at the lower end of the lid body 210. Therefore, if the auxiliary lid 21 is inserted, the inner surface of the through-hole 223 is in contact with the airtight portion 216. For example, in a state where the auxiliary lid 21 is inserted and mounted, the inclined surface of the airtight portion 216 is in contact with the end portion of the inner lower end portion 228.

Meanwhile, the rotation groove 215 may be formed on an outer surface of the lid body 210. The rotation groove 215 may extend from a central portion of the vent hole 214 to a lower end of the lid body 210 and may be recessed inside the lid body 210. In addition, the rotation groove 215 may be formed at a position corresponding to the rotation protrusion 224, and thus, when the lid body 210 is mounted, the rotation protrusion 224 may be inserted towards the inside of the rotation groove 215.

A plurality of rotation grooves 215 may be formed, and the plurality of rotation grooves 215 may be positioned at positions facing each other. The rotation groove 215 may pass through the air chamber 218a, and extend to the lower end of the airtight portion 216, and be opened downward to facilitate insertion of the rotation protrusion 224. In addition, although not illustrated in detail, a groove or a protrusion on which the lid constraining portion 224a is locked and constrained may be further formed inside the rotation groove 215.

Meanwhile, an air vent 217 may be further formed on an outer surface of the lid body 210. The air vent 217 may form a passage through which air inside the container 10 passes through the airtight portion 216 to the air chamber 218a. In other words, the inlet of the air vent 217 is opened at the lower end of the airtight portion 216, that is, at the lower surface of the lid body 210, and the outlet of the air vent 217 may be opened at the upper end of the airtight portion 216, that is, the surface connected with the air chamber 218a.

The inlet and outlet of the air vent 217 may be located at different positions from each other. For example, the inlet and outlet of the air vent 217 may be located on different vertical extension lines. Therefore, a portion of the air and the scattered food flowing into the inlet of the air vent 217 have to change in flow direction while passing through the air vent 217.

In detail, the air vent 217 may include an inlet portion 217a communicating with the inner portion of the container 10, an outlet portion 217b communicating with the air chamber 218a, and a connecting portion 217c for connecting the inlet portion 217a and the outlet portion 217b.

The inlet portion 217a is opened at the lower end of the lid body 210 to form the inlet and may extend vertically upward. The outlet portion 217b is opened to communicate with the air chamber 218a to form an outlet and may extend vertically downward. The inlet portion 217a and the outlet portion 217b may be disposed parallel to each other.

A connecting portion 217c connecting the upper end of the inlet portion 217a and the lower end of the outlet portion 217b may be formed on the central portion 243 of the airtight portion 216. The connecting portion 217c may have a length longer than the height of the inlet portion 217a and the outlet portion 217b, and air flowing from the inside of the container 10 may be guided to the inside of the air chamber 218a along the inlet portion 217a, the connecting portion 217c, and the outlet portion 217b. In addition, even when food scattered inside the container 10 during the operation of the blade device 14 flow into the inlet portion 217a, the connecting portion 217c is formed to have a sufficient length so that it is possible to prevent the food pieces or whole food flowing into the inlet portion 217a from flowing to the outlet portion 217b.

In addition, the air vent 217 is formed on the airtight portion 216 and may be located on one side spaced apart from the rotation groove 215. In other words, the air vent 217 may be located at a position away from the vent hole 214 by a predetermined distance.

For example, a pair of rotation grooves 215 and a pair of air vents 217 may be provided. In addition, a pair of the rotation grooves 215 are positioned opposite to each other, and the pair of air vents 217 may be located in the rotating direction by an angle set based on the center of the pair of rotation grooves 215 and the auxiliary lid 21. Accordingly, it is possible to prevent liquid or food pieces passing through the air vent 217 from flowing through the vent hole 214. Of course, the number and disposition of the air vents 217 are not limited but may be variously positioned at a position spaced apart from the vent hole 214. For example, a pair of air vents 217 may be disposed at opposite positions to face each other, and the vent hold 214 may be disposed in a direction intersecting a line passing through the positions of the pair of air vents.

Hereinafter, with reference to the drawings, the operation of the lid having the configuration as described above will be described in detail.

Figure 13:
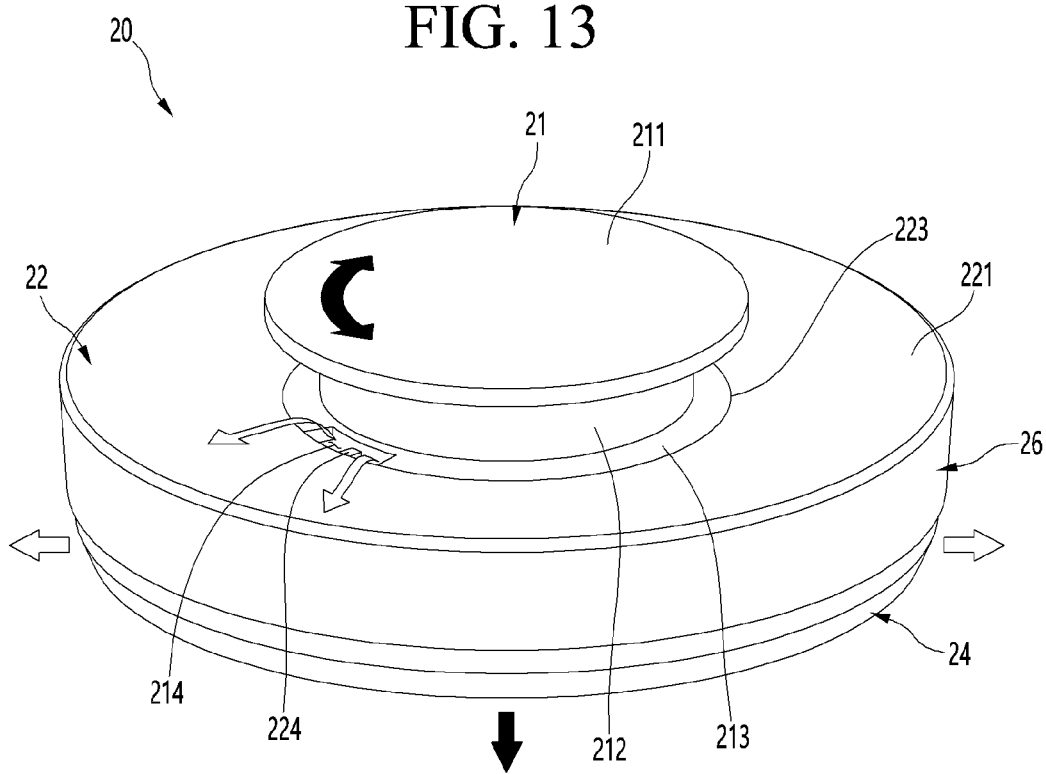
FIG. 13 is a view illustrating an operation state of the lid.

FIG. 13 is a view illustrating an operation state of the lid.

As illustrated in FIG. 13, the lid 20 is to shield the opened upper surface of the container 10. At this time, when the user holds and rotates the lid top portion 211 in a state where the auxiliary lid 21 is mounted on the through-hole 223 of the main lid 27, the upper body 22 of the main lid 27 may be rotated together with the auxillary lid 21.

According to the rotational direction of the upper body 22, the upper body 22 is moved away from or is moved closer relative to the lower body 23. For example, in order to mount the lid 20 on the opened upper surface of the container 10, or to separate the lid 20 in a state mounted on the container 10, the upper body 22 may be moved away relative from the lower body 23.

If the upper body 22 and the lower body 23 are moved away from each other, the central portion 243 of the gasket 24 does not protrude or protrudes less to the outside and may be easily inserted or separated from the inner surface of the container 10. Therefore, in this state, the user can easily insert the lid 20 into the opening of the container 10 and mount the lid 20 in the opening of the container 10, or the lid 20 can be easily separated from the container in a state where the lid 20 is mounted on the container 10.

Meanwhile, if the upper body 22 and the lower body 23 are moved close to each other, the central portion 243 of the gasket 24 protrudes outwardly or protrudes out further and may be in close contact with the inner wall surface of the container 10 when the lid 20 is inserted in the container 10.

In other words, in a state where the lid 20 is inserted into the opened upper surface of the container 10 and is closed when the user holds and rotates the auxiliary lid 21 so that the central portion 243 of the gasket 24 protrudes outward, the space between the container 10 and the lid 20 may be sealed.

In this state, the blade device 14 may be rotated, and food inside the container 10 may be crushed. By the high-speed rotation of the blade device 14, the food inside the container 10 may flow while being scattered, but the lid 20 and the container 10 are maintained in an airtight state to prevent the food inside the container 10 from being leaked or overflowing.

In addition to the operation of determining whether the gasket 24 is sealed through the rotation of the upper body 22, the auxiliary lid 21 can perform the operations such as adding of food inside the container after the user opens the auxiliary lid 21, re-disposing or processing food inside the container 10 using a rod, or the like.

In addition, even in a state that the auxiliary lid 21 is mounted, a structure that communicates with the inside of the container 10 through a specific path is provided, and the air inside the container 10 can be discharged while it is possible to prevent the food inside the container 10 from overflowing or being discharged.

With reference to the drawings, the action of the discharge of air while blocking the discharge of food through the auxiliary lid 21 will be described in more detail.

Figure 14:
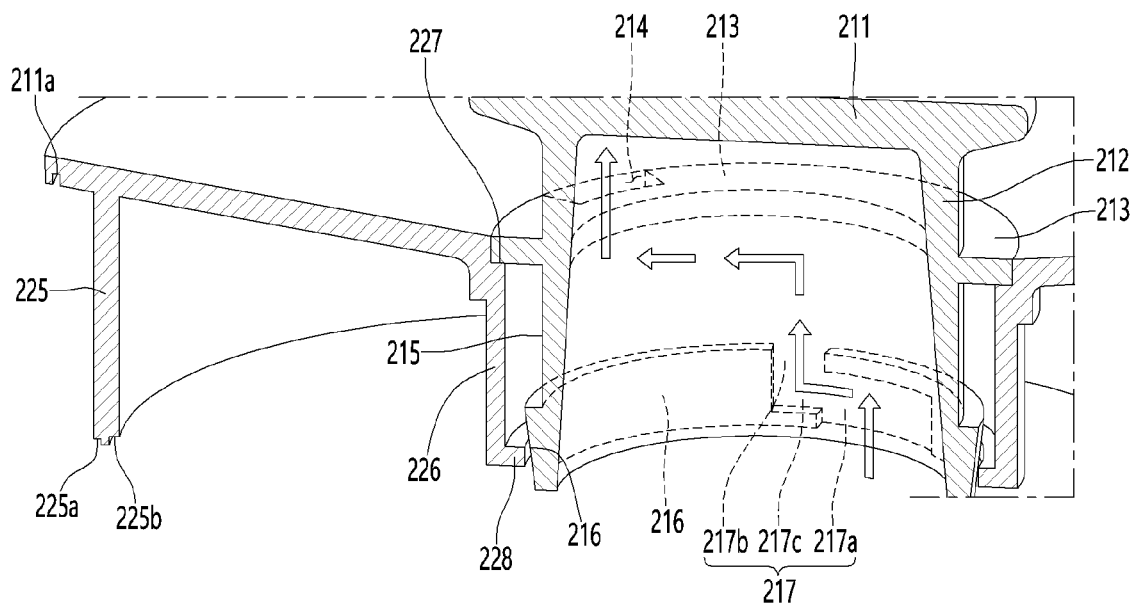
FIG. 14 is a partially cut-away cross-sectional view taken along line 14-14' of FIG. 8, illustrating a state where the air inside the container is discharged to the outside.

FIG. 14 is a partially cut-away cross-sectional view taken along line 14-14' of FIG. 8, illustrating a state where the air inside the container is discharged to the outside.

As illustrated, in a state where the lid 20 is mounted on the container 10 and the auxiliary lid 21 is mounted to shield the through-hole 223, if the blade device 14 rotates at high speed, food is crushed or grounded while being scattered inside the container 10. At this time, if air discharge to the outside or air flowing into the container is possible, the inside of the container 10 maintains an appropriate pressure, and the rotating food can stably flow within the container 10. Through this, it is possible to reduce the degree of scattering of food inside the container 10, and the food can be evenly crushed or grounded.

The air inside the container 10 is naturally directed to the air chamber 218a through the air vent 217, and the air flowing along the air chamber 218a can be discharged through the vent hole 214 to the outside. In other words, despite the bent shape of the air vent 217 and the distance between the air vent 217 and the vent hole 214, the flow of air may be smoothly performed, and the inside of the container 10 may be stabilized through the external discharge of air.

In addition, in a situation where the pressure inside the container 10 is increased, the air inside the container 10 can be discharged through the air vent 217 and the vent hole 214, and thus there is an advantage in that the lid of the container 10 can be prevented from being opened arbitrarily by pressure.

Of course, although not illustrated, when the blade device 14 is rotated at a high speed, the outside air passes through the vent hole 214, the air chamber 218a, and the air vent 217 one after another and then may flow into the inner portion of the container 10.

Figure 15:
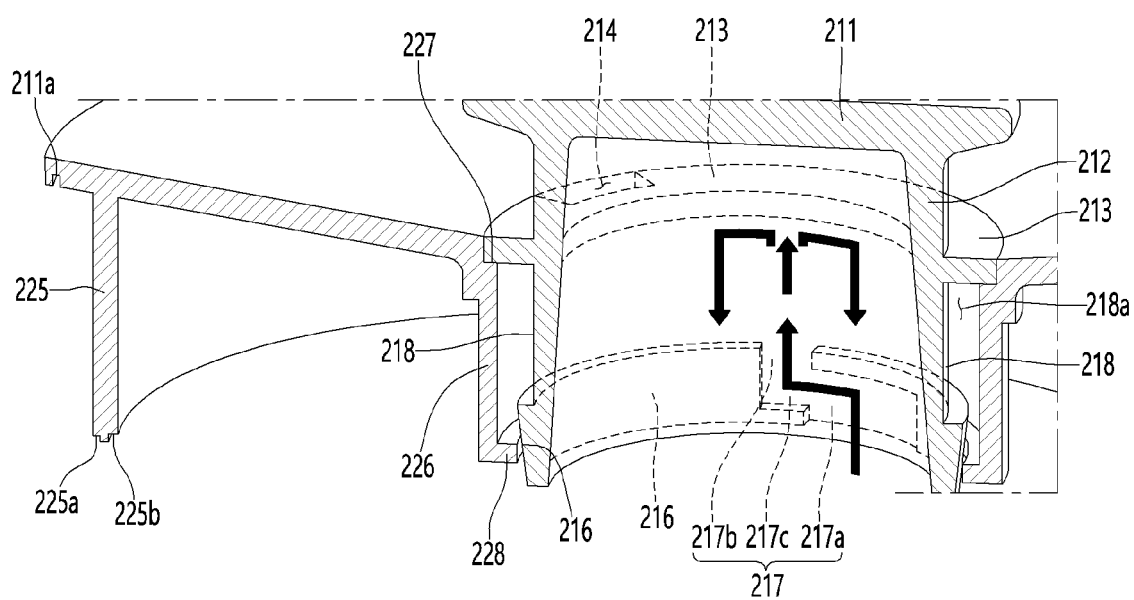
FIG. 15 is a partially cut-away cross-sectional view taken along line 14-14' of FIG. 8, illustrating a state where the food inside the container flows.

FIG. 15 is a partially cut-away cross-sectional view taken along line 14-14' of FIG. 8, illustrating a state where the food inside the container flows.

As illustrated in the drawing, in a state where the lid 20 is mounted on the container 10 and the auxiliary lid 21 is mounted to shield the through-hole 223, the food inside the container 10 may be crushed or grounded, and thus processed by the rotational operation of the blade device 14. During this process, food inside the container 10 may be quickly rotated or scattered, and some food may flow with air that is being discharged out of the container 10.

In other words, some of the food that is liquefied or small in size may flow along the air vent 217. In other words, some of the food inside the container 10 may flow through the inlet portion 217a of the air vent 217. Some of the food flowing into the inlet portion 217a may flow back into the container 10 in the process of flowing along the bent connecting portion 217c, and some thereof may pass through the connecting portion 217c and face the outlet portion 217b. Usually, with the food flowing into the air vent 217, the food may not pass through the connecting portion 217c and the outlet portion 217b, and the food may flow back down into the inlet portion 217a and back into the container 10 again.

Meanwhile, in some cases, fine food pieces or liquefied food may completely pass through the air vent 217. However, even in this case, as illustrated in FIG. 15, in a state where the fine food pieces or liquefied food passes through the air vent 217 and is discharged into the air chamber 218a, the fine food pieces or liquefied food may flow down again into the air vent 217. In other words, the outlet of the air vent 217 and the vent hole 214 are sufficiently spaced apart from each other, and thus even food passing through the air vent 217 does not pass through the air chamber 218a and towards the vent hole 214, but instead flows back down into the air vent 217. In other words, while the blade device 14 is operated, the food inside the container 10 is not discharged to the outside or leaked, and in particular, the food is not discharged through the air vent 217 and out of the vent hole 214, so that it is possible to avoid a mess at the container 10 and maintain a clean appearance.

As described above, when mounting the lid 20 to the container 10, the vent hole 214, the air chamber 218a, and the air vent 217 structure allow air to enter and exit the inner portion and the outer portion of the container 10, while being possible to prevent the food inside the container 10 from being discharged to the outside.

In the above description, numerous specific details are set forth in order to provide a thorough understanding of the present disclosure. The present disclosure may be practiced without some or all of these specific details. Examples of various embodiments have been illustrated and described above. It will be understood that the description herein is not intended to limit the claims to the specific embodiments described. On the contrary, it is intended to cover alternatives, modifications, and equivalents as may be included within the spirit and scope of the present disclosure.

What is claimed is:

1. A blender comprising:
   a main body provided with a motor assembly;
   a container detachably mountable on the main body and having an opened upper surface;
   a blade provided at a bottom surface of the container configured to be rotated by the motor assembly;
   a main lid configured to shield the opened upper surface of the container and formed with a through-hole which is opened to communicate with an inside of the container;
   an auxiliary lid insertable into the through-hole, configured to open and close the through-hole;
   wherein the auxiliary lid includes,
   an airtight portion disposed along a lower end of a circumferential surface of the auxiliary lid configured to contact an inner surface of the through-hole when the auxiliary lid is inserted therein;

an auxiliary lid rib spaced apart from an upper end of the airtight portion and protruding along a circumference of the auxiliary lid and formed in a shape corresponding to the through-hole to shield the through-hole;

an air chamber recessed around the auxiliary lid, configured to form a space between the auxiliary lid and the inner surface of the through-hole;

a vent hole penetrating in an up and down direction through the auxiliary lid rib and exposed an outside environment and configured to communicate with an upper side of the air chamber to discharge air of the air chamber to the outside environment; and an air vent recessed at the airtight portion below the air chamber and configured to guide air in the container to the air chamber, wherein the air vent includes, an inlet portion downwardly extended to communicate with the inside of the container, an outlet portion upwardly extended from a position spaced apart from the inlet portion to communicate with a lower side of the air chamber, and a connecting portion connecting an upper end of the inlet portion and a lower end of the outlet portion to each other, wherein the air chamber is defined by an upper end of the airtight portion and lower end of the auxiliary lid rib, and the air chamber is formed to have a width wider than the air vent, wherein the vent hole, the inlet portion and the outlet portion are disposed on different vertical extension lines with respect to a bottom surface of the auxiliary lid, wherein a rotation protrusion protruding from the inner surface of the through-hole, and a rotation groove disposed on an outer surface the auxiliary lid, which extends in an insertion direction of the auxiliary lid and is recessed to receive the rotation protrusion, and the rotation groove is formed at a position corresponding to the vent hole, and extended below the vent hole to a low end of the auxiliary lid.

2. The blender of claim 1,
wherein the airtight portion is disposed at a lower end of the auxiliary lid and has an increasing outer diameter going upward.

3. The blender of claim 1,
wherein the air vent is a plurality of air vents, and each of the plurality of air vents communicates with the air chamber.

4. The blender of claim 1,
wherein the main lid includes a through-hole seating portion disposed on the inner surface of the through-hole configured to seat the auxiliary lid rib when the auxiliary lid is inserted into the through-hole.

5. The blender of claim 1,
wherein the outlet portion is provided between the vent hole and the inlet portion in a direction of a circumference of the auxiliary lid.

6. The blender of claim 1,
wherein the inlet portion and the outlet portion extend in opposite directions from positions spaced apart from each other.

7. The blender of claim 1,
wherein the connecting portion extends along a circumference of the auxiliary lid.

8. The blender of claim 1,
wherein the air vent includes a pair of air vents that are disposed at opposite positions to face each other.

9. The blender of claim 1,
wherein the main lid includes
an upper body forming an upper shape of the main lid and forming an inner surface of the through-hole,
a lower body disposed under the upper body and forming a lower shape of the main lid, and
a gasket which is provided between the upper body and the lower body, and which can protrude to the outside to be in contact with an inner surface of the container.

10. The blender of claim 9,
wherein the upper body is configured to move in the vertical direction with respect to the lower body by rotation of the upper body, and
when the upper body moves in the vertical direction towards the lower body, the gasket configured to protrude in a radial direction to press against and be in contact with the inner surface of the container.

11. The blender of claim 10,
wherein the lower body includes a lifting and lowering guide configured to guide the upper body in a rotational direction to move the upper body in the vertical direction, and is disposed on the circumference of the lower body.

12. The blender of claim 1,
wherein a lid constraining portion protrudes inward into the through-hole and is configured to be locked and constrained inside the rotation groove.

13. The blender of claim 12, wherein the auxiliary lid rib is disposed above the rotation groove, and the auxiliary lid is configured to seat the auxiliary lid rib at the through-hole when the auxiliary lid is inserted into the through-hole.

14. The blender of claim 13,
wherein the vent hole is penetrated on the auxiliary lid rib corresponding to the rotation groove.

15. The blender of claim 13,
wherein the rotation protrusion is disposed of below the vent hole and located between both side ends of the vent hole.

* * * * *